Jan. 11, 1966  D. M. NEALE  3,229,196
MONITORING DEVICE AND METHOD
Filed April 26, 1963

Jan. 11, 1966 D. M. NEALE 3,229,196
MONITORING DEVICE AND METHOD
Filed April 26, 1963 4 Sheets-Sheet 4

Inventor
Denis Manktelow Neale
By Cushman, Darby & Cushman
Attorneys his invention relates to a monitoring device and method, and more particularly to a method for measuring the amount of magnetic oxide of iron carried by a support.

United States Patent Office 3,229,196
Patented Jan. 11, 1966

3,229,196
MONITORING DEVICE AND METHOD
Denis Manktelow Neale, Ilford, England, assignor to Ilford Limited, Essex, England, a British company
Filed Apr. 26, 1963, Ser. No. 275,967
Claims priority, application Great Britain, May 4, 1962, 17,308/62
3 Claims. (Cl. 324—34)

This invention relates to a monitoring device and method, and more particularly to a method for measuring the amount of magnetic oxide of iron carried by a support.

It is known practice to apply a stripe of magnetic iron oxide to the edge of motion picture film to serve as a medium for impressing on the film a sound record. It is an object of the present invention to provide a method, and apparatus for use in said method, for monitoring the amount of magnetic oxide so applied.

Further objects and the entire scope of the invention will become more fully apparent when considered in light of the following detailed description of the illustrative embodiment of this invention and from the appended claims.

The illustrative embodiment may be best understood by reference to the accompanying drawings wherein.

According to the present invention there is provided a method of measuring the amount of magnetic oxide of iron applied to a substrate, which method comprises cyclically moving at least the ferromagnetic core on which is wound the coil of a first oscillator so that a gap in the core alternately embraces and fails to embrace part of the substrate carrying the said oxide, mixing the output of said oscillator with the output of a second oscillator to produce a beat frequency, passing said beat frequency to a frequency discriminator and measuring the amplitude of the alternating component present in the output of said frequency discriminator.

Figure 1:
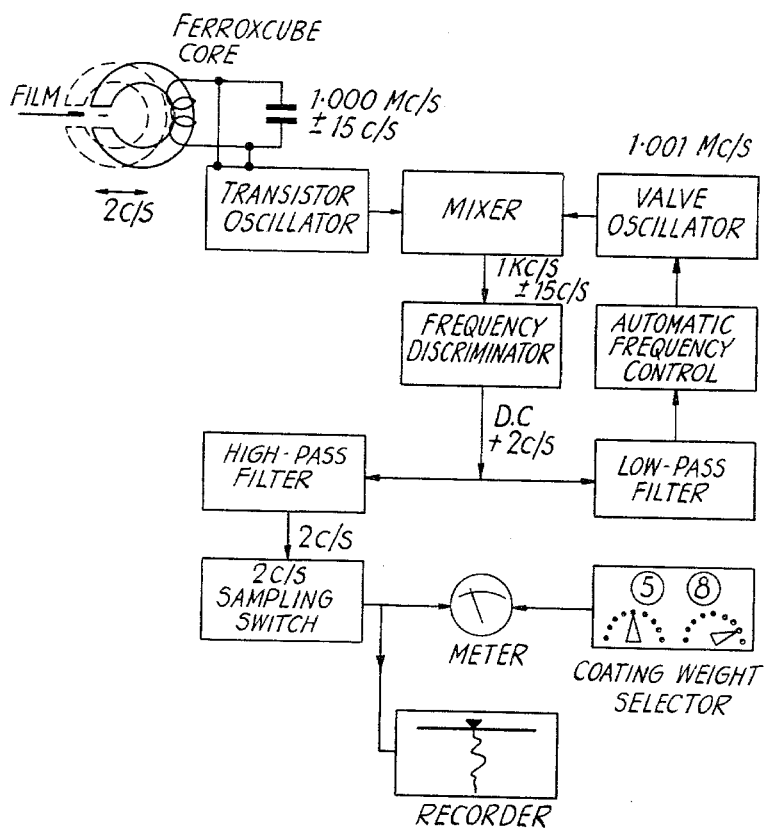
FIGURE 1 is a block diagram of a complete monitoring device according to the invention.

Apparatus for use in the said process and an indication of the method of use is given, for a specific embodiment, in the accompanying drawings. The apparatus, which is indicated in FIGURE 1, is designed to measure the amount of magnetic iron oxide applied to 16 mm. width motion picture film by a stripping machine. The measurement is independent of the speed of traverse of the film and, since no physical contact is made with the film, the measurement can be made immediately after the application of the magnetic oxide stripe, i.e. while it is still wet. The scale is strictly linear and an accuracy of the order of 1% may be obtained despite normal variations in temperature, supply voltage and supply frequency.

Referring to FIGURE 1, a transistor oscillator operating at about 1 mc./s. has a coil wound on a Ferroxcube core. The term "Ferroxcube," as used throughout the specification, relates to a class of magnetic ferrite material characterized by high bulk resistivity and is thus suitable as a material to be used in cores of transformers and inductors for use at radio frequencies. When a 100-mil stripe enters an air gap in the Ferroxcube core, the oxide lowers the reluctance of the gap, increasing the inductance of the coil and so lowering the oscillator frequency. A motor-driven cam moves the whole transistor oscillator to and from the film at 2 c./s. so that the gap in the Ferroxcube core embraces the stripe at one extreme of its travel. As a result, the oscillator frequency falls by about 30 c./s. and rises again twice per second. The frequency-modulated output of the oscillator is mixed with the output from a valve oscillator, the frequency of which differs by only 0.1%. The mixer yields a 1 kc./s. beat frequency which, like the transistor oscillator, is frequency modulated at 2 c./s. with a deviation proportional to the oxide coating weight. The beat frequency is fed to a frequency discriminator to provide an output with a D.C. component proportional to the beat frequency and superimposed a 2 c./s. component of amplitude proportional to coating weight. This A.C. component is rectified and used to operate a meter and chart recorder. By using a synchronous sampling switch as a rectifier, it is possible to obtain a rapid response despite the low sampling frequency of 2 c./s.

The D.C. output from the frequency discriminator is used to control the frequency of one oscillator so that the beat frequency remains at about 1 kc./s. and so on the linear range of the discriminator. A slight improvement in stability is obtained when the other oscillator is crystal controlled and all frequencies are then stabilised.

The use of the valve oscillator to cooperate with the transistor oscillator to produce a beat frequency is important from a practical point of view since it facilitates the measurement of the small sampling frequency changes when the magnetic oxide is sensed. This is due to the fact that the use of a beat frequency reduces the performance requirements for the frequency discriminator, and it permits improved stability of the circuitry.

Figure 2:
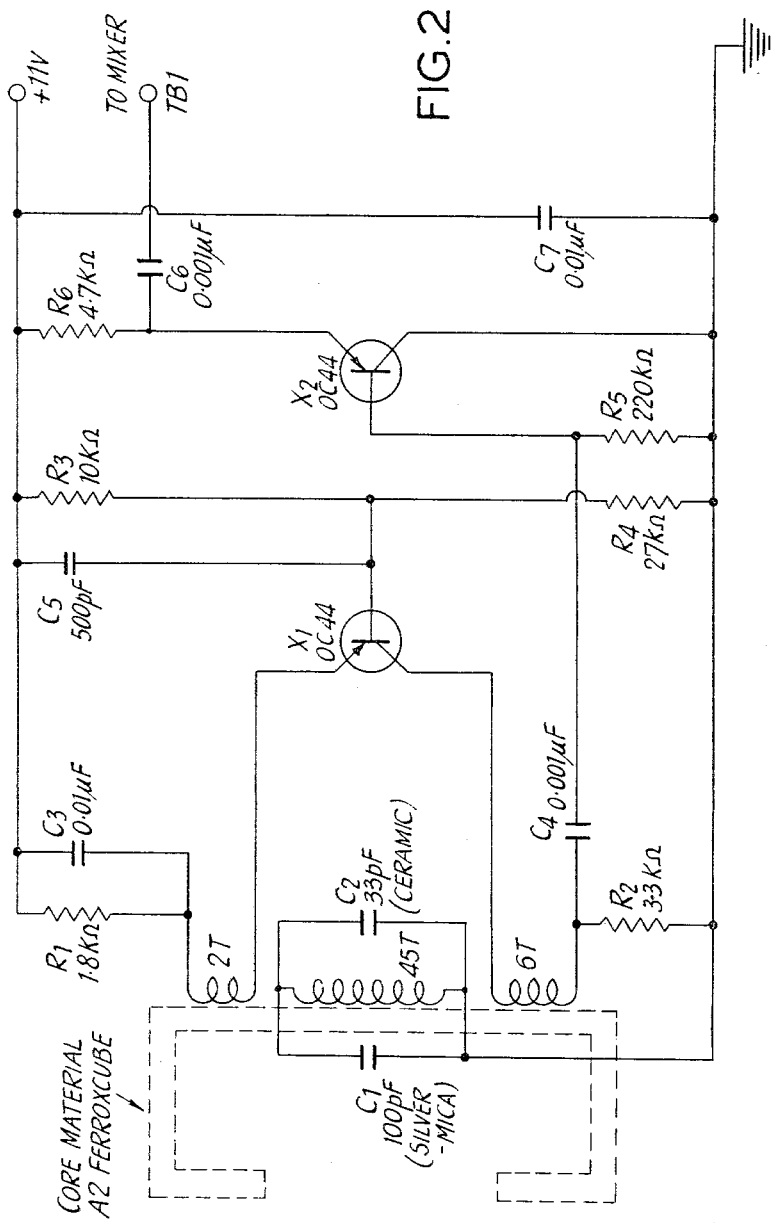
FIGURE 2 is a schematic diagram of a transistor oscillator which may be employed in the embodiment shown in FIGURE 1.

FIGURE 2 shows the circuit diagram of the transistor oscillator. This comprises a junction transistor X1, Mullard Type OC44, in a transformer-coupled oscillator circuit, the output of which is fed by a second transistor X2, Mullard Type OC44, operating as an emitter follower so that a relatively long coaxial cable, TB1, may be used to carry the output signal to the mixer. The oscillator and emitter follower are mounted in a Duralumin box measuring 2⅜" x 2¼" x 1½". The transformer windings of the oscillator are wound on a core of A2 "Ferroxcube" ferrite material. This core is C-shaped and the ends of the core protrude through one wall of the box so that they may embrace the film to be monitored.

The whole of the Duralumin box containing the oscillator and emitter follower is mounted on guides and reciprocated over a distance of ½" by an eccentric cam driven by a motor at 120 r.p.m. The assembly of box, guides, cam and motor is so positioned that at one extremity of its travel the box is placed so that the ends of the Ferrocube core embrace the film to be monitored whilst at the other extremity the box is withdrawn from the film so that no magnetic oxide lies between the ends of the transformer core.

Figure 3:
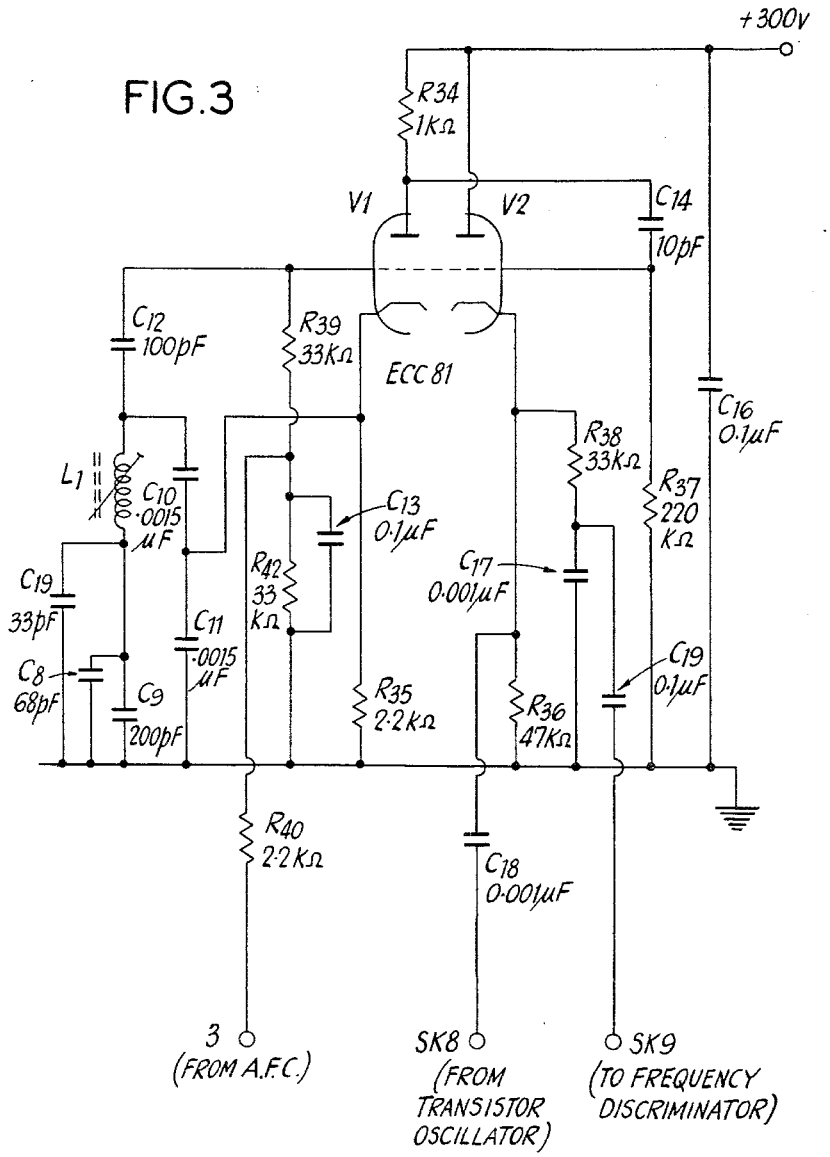
FIGURE 3 is a schematic diagram of a valve oscillator and mixer which may be employed in the embodiment illustrated in FIGURE 1.

FIGURE 3 represents the valve oscillator and mixer. The combination of the triode valve, V1, inductor L1 and capacitors C8, C9, C10, C11, C12, C19 forms a Clapp oscillator of known type. The frequency of oscillation is determined primarily by the values of L1 and the aforesaid capacitors but to some extent may be controlled by the D.C. potential applied through lead 3 to provide bias to the grid of valve V1. As the potential of lead 3 is made increasingly positive with respect to ground, the current flowing through V1 increases and its mutual conductance increases also. As a result the input capacitance of V1 increases due to increased Miller effect and the frequency of oscillation is slightly reduced. The significance of this frequency control will be discussed later.

From the anode of V1, capacitor C14 applies a signal from the valve oscillator to the grid of triode valve V2, which is used as a frequency mixer. Lead SK8 is connected to lead TB1 of the emitter follower X2, shown in FIGURE 2, to apply the frequency generated by the transistor oscillator through capacitor C18 to the cathode of valve V2. When the frequency generated by the valve oscillator V1 and the transistor oscillator X1 differ by 1 kc./s., a beat frequency of 1 kc./s. is developed across capacitor C17 and is applied through C19 and lead SK9 to the input of the frequency discriminator.

The frequency discriminator is a circuit designed to deliver a D.C. output voltage proportional to the frequency of an input signal which is in the audio-frequency band. The D.C. output voltage is substantially independent of the amplitude of the audio-frequency input signal. The counting rate meter described by Cooke-Yarborough and Pulsford is suitable for this purpose ("A Counting Rate Meter of High Accuracy," Proceedings Institution of Electrical Engineers, Part 2, pages 191–195, April 1951) provided it is followed by a low-pass m-derived filter designed to attenuate any residual audio-frequency component in the output, but to pass D.C. and sub-audio-frequencies with negligible attenuation.

Figure 4:
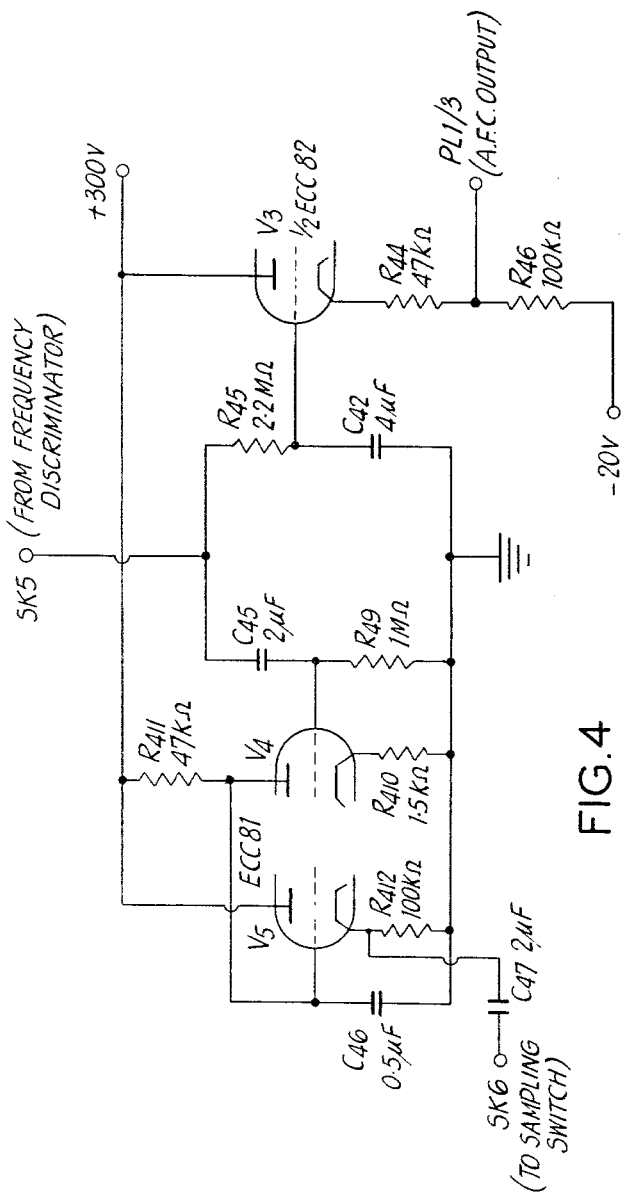
FIGURE 4 is a schematic diagram of a high-pass and low-pass filter arrangement which may be employed in the embodiment shown in FIGURE 1.

The output from the frequency discriminator, after it has passed through the said m-derived filter, is applied to lead SK5 in FIGURE 4. It will be seen in FIGURE 4 that the combination of R45 and C42 forms a low-pass filter, applying to the grid of V3 only the D.C. component of the output from the frequency discriminator. Valve V3 operates as a cathode follower part of the output of which is carried by lead PL1/3 to apply bias to the oscillator valve, V1, in FIGURE 3.

Also in FIGURE 4, it will be seen that the combination of capacitor C45 and resistor R49 form a high-pass filter, applying to the grid of V4 only the low frequency A.C. (2 c./s.) component of the output of the frequency discriminator. The D.C. component of the output of the frequency discriminator is blocked by C45. Valve V4 amplifies the low frequency signal applied to it. Valve V5 is a cathode follower connected to the amplified output of V4 and providing, through capacitor C47 and lead SK6, an alternating signal at 2 c./s. which is applied to the 2 c./s. sampling switch.

The 2 c./s. sampling switch comprises a photo-electric switching system and cathode follower valves substantially as described elsewhere by the inventor. ("A Photo-Electric Sampling Switch for Split-Beam Photo-Electric Instruments," Journal of Scientific Instruments, 32, p. 223, 1955). The said cathode follower valves may be used to operate a moving coil meter or a chart recorder. According to known techniques a switched potentiometer connected to a source of D.C. may be used to back off the indication of either the meter or the recorder so that a zero indication is provided for a particular output voltage from the 2 c./s. sample switch. This feature is represented in the block schematic, FIGURE 1, by the item marked "Coating Weight Selector."

The operation of the apparatus will now be described with reference to FIGURES 1–4 and the foregoing description.

When power is first applied to the oscillator the lead PL1/3 in in FIGURE 4 applies a negative bais to V1 in FIGURE 3. As a result the frequency of oscillation of V1 is considerably higher than the mean frequency of oscillation of the transistor oscillator X1 in FIGURE 2. The relatively large difference in the frequencies of the two oscillators gives rise to a beat frequency in the higher audio-frequency band which is passed by lead SK9 in FIGURE 3, to the frequency discriminator. In response to this high audio-frequency signal, the frequency discriminator delivers a large D.C. output signal. As this output signal charges C42, in FIGURE 4, the valve V3 progressively raises the potential of lead PL1/3, in FIGURE 4, which is connected to lead 3 in FIGURE 3.

As the potential of lead 3 is raised, the frequency of valve oscillator V1, falls as described above. This reduces the frequency of the beat frequency signal produced in the mixer valve, V2, and accordingly there is a corresponding reduction in the D.C. output signal delivered by the frequency discriminator. The arrangements described will be recognized by those skilled in the art as an Automatic Frequency Control (A.F.C.) System serving to maintain the frequency of the valve oscillator in fixed relation to the frequency of the transistor oscillator. In the apparatus described, frequency of the valve oscillator is maintained in this way at approximately 1 kc./s. above the mean frequency of the transistor oscillator.

As the transistor oscillator is moved towards the film carrying magnetic oxide of iron, the reluctance of the path between the ends of the C-shaped Ferroxcube core is reduced by the presence of the magnetic iron oxide. This reduction in reluctance increases the tuning inductance of the transistor oscillator and thereby reduces the frequency of oscillation by about 30 c./s. below the frequency produced when there is no magnetic oxide between the ends of the Ferroxcube core. The reduction in frequency is greater for larger quantities of magnetic iron oxide. As the permeability of magnetic oxide is relatively low, even quite large quantities of magnetic oxide produce only a small percentage reduction in the reluctance of the gap in the Ferroxcube core. If follows, therefore, that with the coating thicknesses of magnetic oxide which are of practical interest in the manufacture of magnetically striped film or tape, the reduction in oscillator frequency is strictly proportional to the amount of oxide introduced into the gap in the Ferroxcube core.

As the motor driven cam reciprocates the Duralumin box to and from the film at 2 c./s., the transistor oscillator is frequency modulated at 2 c./s. with a frequency deviation of ±15 c./s. The output from the mixer valve, V2 in FIGURE 3, will accordingly show a frequency modulation at 2 c./s. with a frequency deviation of ±15 c./s. of the mean beat frequency which is approximately 1 kc./s. already described.

The output signal obtained from the frequency discriminator, therefore, comprises of D.C. component proportional to the mean beat frequency and, superimposed on this D.C. component, a 2 c./s. alternating component of amplitude proportional to the frequency deviation of the transistor oscillator, this 2 c./s. component passes through the high pass filter, represented by C45 and R49 in FIGURE 4, and, after amplification, is applied to the sampling switch. The D.C. output from the sampling switch is proportional to the amplitude of the 2 c./s. alternating signal.

Since the 2 c/s. signal is proportional to the frequency deviation of the transistor oscillator and since this frequency deviation is, in turn, proportional to the amount of magnetic oxide entering the gap in the Ferroxcube core, it follows that the D.C. output from the sampling switch is proportional to the amount of oxide monitored by the reciprocating Duralumin box.

I claim as my invention:

1. A method of measuring the amount of magnetic oxide of iron applied to a substrate, which method comprises cyclically moving at least the ferromagnetic core on which is wound the coil of a first oscillator so that a gap in the core alternately embraces and fails to embrace part of the substrate carrying the said oxide, mixing the output of said oscillator with the output of a second oscillator to produce a beat frequency, passing said beat frequency to a frequency discriminator and measuring the amplitude of the alternating component present in the output of said frequency discriminator.

2. Apparatus for monitoring the amount of magnetic iron oxide applied to a substrate which comprises an oscillator of which the coil is wound on a ferromagnetic core, means for moving the core so that a gap in the core alternately embraces and fails to embrace part of the substrate carrying the said oxide, means for mixing the output of the said oscillator with the output of a second oscillator to produce a beat frequency, a frequency discriminator, means for feeding the beat frequency to said frequency discriminator and means for measuring the amplitude of the alternating component present in the output of the said frequency discriminator.

3. Apparatus for monitoring the amount of magnetic oxide of iron applied to a substrate which comprises a transistor oscillator operating at about 1 mc./s. and having a coil wound on a Ferroxcube core means for moving the said oscillator at a frequency of 2 c./s. to and from a moving band of film to which has been applied a stripe of magnetic iron oxide so that the stripe is embraced by an air gap in the Ferroxcube core at one extremity of the travel of the oscillator, a valve oscillator of output differing by only 0.1% from the frequency modulated output of the said transistor oscillator, means for mixing the frequency-modulated output of the said transistor oscillator with the output of the valve oscillator to produce a beat frequency of 1 kc./s. frequency modulated at 2 c./s. with a deviation proportional to the coating weight of the magnetic oxide, means for feeding the beat frequency to a frequency discriminator to provide an output with a D.C. component proportional to the beat frequency and superimposed a 2 c./s. component of amplitude proportional to the coating weight of the magnetic iron oxide, means for rectifying the resulting A.C. component and means for recording the said A.C. component.

No references cited.

RICHARD B. WILKINSON, *Primary Examiner.*